US006560417B1

(12) United States Patent
Rodriguez

(10) Patent No.: US 6,560,417 B1
(45) Date of Patent: May 6, 2003

(54) METHOD AND APPARATUS FOR MODIFYING A PRINTING PROCESS IN RESPONSE TO ENVIRONMENTAL CONDITIONS WITHIN THE ELECTROPHOTOGRAPHIC AREA OF A PRINTER

(75) Inventor: Santiago Rodriguez, Boise, ID (US)

(73) Assignee: Hewlett-Packard Development Co., L.P., Houston, TX (US)

( * ) Notice: Subject to any disclaimer, the term of this patent is extended or adjusted under 35 U.S.C. 154(b) by 0 days.

(21) Appl. No.: 09/994,649

(22) Filed: Nov. 28, 2001

(51) Int. Cl.[7] ............................................. G03G 15/08
(52) U.S. Cl. ......................................... 399/27; 399/44
(58) Field of Search ............................ 399/44, 46, 51, 399/53, 177, 27, 24

(56) References Cited

U.S. PATENT DOCUMENTS 6,131,009 A * 10/2000 Hasegawa ................... 399/328

6,226,465 B1 * 5/2001 Funatani ..................... 399/44

FOREIGN PATENT DOCUMENTS

| JP | 3-4252 | * | 1/1991 | .................... 399/8 |
| JP | 2000187363 | * | 7/2000 | |

* cited by examiner

Primary Examiner—Quana M. Grainger

(57) ABSTRACT

A method of modifying an electrophotographic process in response to an environmental factor within an electrophotographic area of a printing device is disclosed. The method includes sensing the environmental factor within the electrophotographic area of the printing device and modifying the electrophotographic process in response to the sensed environmental factor. A computer readable medium on which is embedded computer software is also disclosed. The software is executable to perform the above mentioned method. A system for performing the above mentioned method is also disclosed.

22 Claims, 3 Drawing Sheets

METHOD AND APPARATUS FOR MODIFYING A PRINTING PROCESS IN RESPONSE TO ENVIRONMENTAL CONDITIONS WITHIN THE ELECTROPHOTOGRAPHIC AREA OF A PRINTER

FIELD OF THE INVENTION

This invention relates generally to printing, and more particularly, although not exclusively, to modifying a printing process in response to environmental conditions within the electrophotographic area of a printer.

BACKGROUND OF THE INVENTION

It is generally known that environmental conditions may impact various aspects of the printing process. For example, in inkjet printers, dry air (i.e., low relative humidity) may exacerbate pen decap. In another example, in electrophotographic ("EP") printers (e.g., laser printers, etc.), cold and/or dry air may effect toner transfer and thus, image quality and toner usage. Additionally environmental conditions may effect estimation of toner usage in EP printers.

To address the impact of environmental conditions on the printing process, various conventional printing devices have sought to optimize the printing process for so-called "typical" environmental conditions. However, as printing technology has improved, pixel size has generally been reduced. Along with this reduction in pixel size, a corresponding increase in the impact of environmental conditions has occurred. For example, to decrease pixel size, toner particle size has decreased. In general, smaller particles may be more susceptible to fluctuations in electrostatic charge due to environmental conditions. Thus, the image quality of these prior art printer may only be acceptable for a relatively narrow range of environmental conditions.

Additionally, some conventional printing devices modify certain printing processes by utilizing conventional sensors to measure environmental conditions in the vicinity of the printer. For example The U.S. Pat. No. 5,655,174, currently assigned to HEWLETT-PACKARD COMPANY, discloses a printing system including an ambient condition sensor for estimating the consumption of toner and the disclosure of which is hereby incorporated by reference in its entirety.

SUMMARY OF THE INVENTION

In one respect, the invention pertains to a method for modifying an electrophotographic process in response to an environmental factor within an electrophotographic area of a printing device. The method includes sensing the environmental factor within the electrophotographic area of the printing device and modifying the electrophotographic process in response to the sensed environmental factor.

In another respect, the invention pertains to a computer readable medium on which is embedded computer software. The software is executable to perform a method of modifying an electrophotographic process in response to an environmental factor within an electrophotographic area of a printing device. The method includes sensing the environmental factor within the electrophotographic area of the printing device and modifying the electrophotographic process in response to the sensed environmental factor.

In yet another respect, the invention pertains to a system for determining an environmental factor within a printing area of a printer. The system includes a sensor that is operable to sense the environmental factor within the printing area of the printer and a processor system that is configured to communicate with the sensor and determine the environmental factor based on the data associated with the environmental factor.

In comparison to known prior art, certain embodiments of the invention are capable of achieving certain aspects, including some or all of the following: (1) improve image quality; (2) improve toner usage estimation; (3) more stable transfer of toner and (4) reduce the number of parts in the printer and thus, increase reliability. Those skilled in the art will appreciate these and other aspects of various embodiments of the invention upon reading the following detailed description of a preferred embodiment with reference to the below-listed drawings.

DETAILED DESCRIPTION OF A PREFERRED EMBODIMENT

Figure 1:
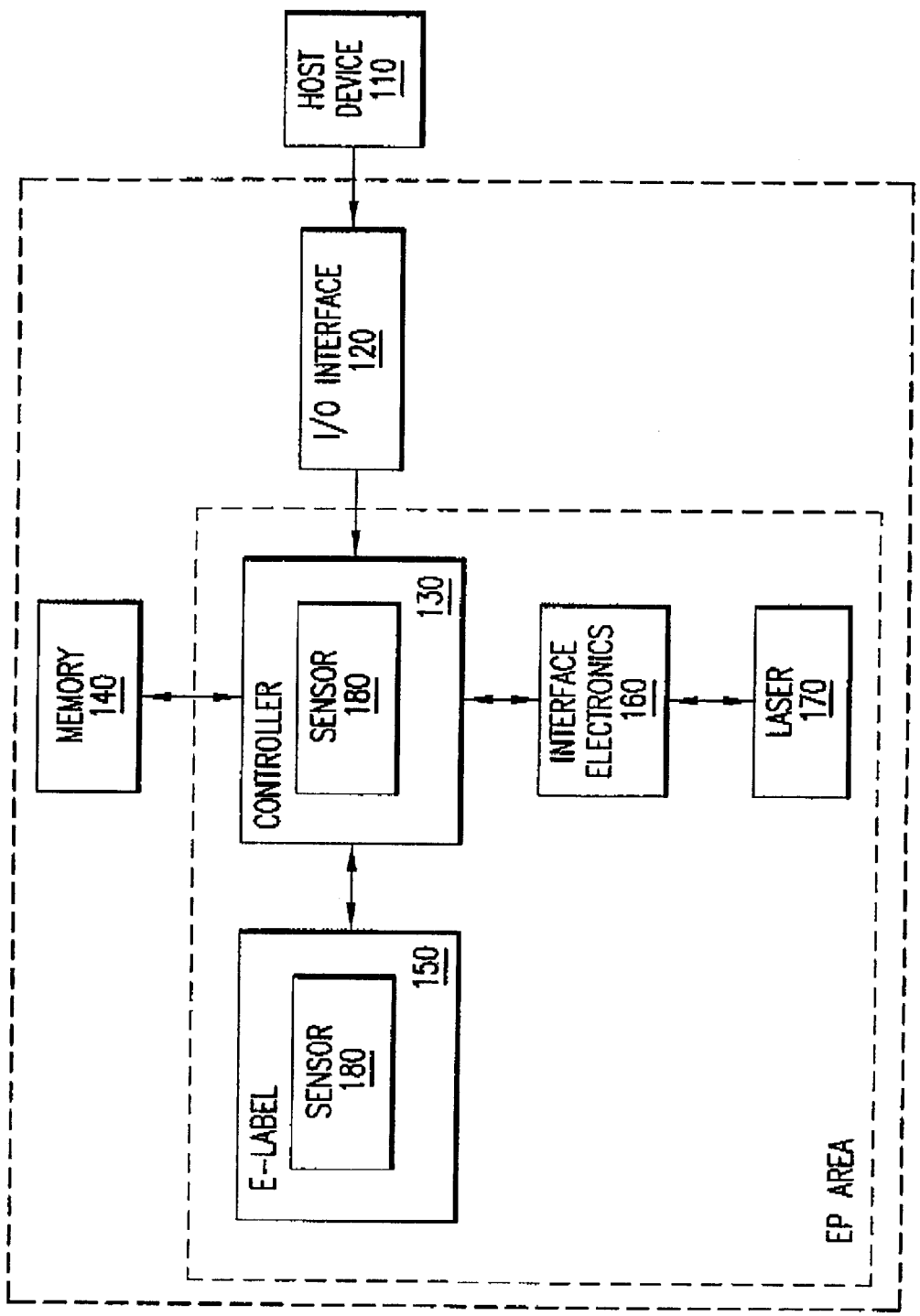
FIG. 1 is a block diagram of a system, according to an embodiment of the invention.

For simplicity and illustrative purposes, the principles of the invention are described by referring mainly to an exemplary embodiment thereof, particularly with references to a system to measure the temperature and relative humidity within the printing area of a laser printer. However, one of ordinary skill in the art would readily recognize that the same principles are equally applicable to, and may be implemented in, a system capable of determining any environmental factor within any printing device, and that any such variations are within the scope of the invention. While in the following description numerous specific details are set forth in order to provide a thorough understanding of an embodiment of the invention, in other instances, well known methods and structures have not been described in detail so as not to obscure the invention. Furthermore, the terms "connected" and its variants, as used herein, mean connected directly or indirectly through an intermediary element.

While a variety of methods to measure relative humidity ("RH") exists, two particular methods that may be incorporated within an integrated circuit chip ("ICC") generally rely on either resistance or capacitance. Examples of ICC compatible RH meters utilizing a material with electrical resistance properties that are altered as a function of moisture content are Dunmore cells and Pope cells.

The Dunmore cell consists of a wire grid on an insulating substrate which is coated with lithium chloride solution. Lithium chloride is hygroscopic and therefore takes up moisture from the air. The resulting resistance of the sensor is an indication of the relative humidity in the air.

The Pope cell is similar to the Dunmore cell, however instead of lithium chloride solution Pope cells use polystyrene as a substrate for the conductive wire grid. In this design, the polystyrene is treated with sulfuric acid, which produces a thin hygroscopic layer on its surface. Changes in humidity cause large changes in the impedance of this layer, and because the operating portion of the sensor is only its surface, its speed of response is relatively fast, e.g., only a few seconds. The impedance is measured by an alternating current ("AC") excited Wheatstone bridge, and the nonlinear output may cover a range of 15 to 99% RH.

An example of an RH meter utilizing capacitance to sense RH and/or dew point is the thin-rim capacitance meter. One variation is to form a capacitor by depositing a layer of porous aluminum oxide on a conductive aluminum substrate and coating the oxide with a thin film of condensation from evaporated gold. The aluminum substrate and the gold film serve as the electrodes of the capacitor. When exposed to air, the water vapors penetrate through the gold layer into the aluminum oxide dielectric and are absorbed by it. The amount of water absorbed determines the capacitance registered by the sensor. The capacitance-type elements may be used in portable, battery-operated indicators or in microprocessor-based instruments, capable of measuring the moisture content of the air in % RH, parts per million, or dew-point units. Design variations of the capacitance-type humidity sensor include the replacement of aluminum oxide dielectric with hygroscopic polymer dielectrics.

Additionally, printing devices may include one or more ICCs e.g., a controller, memory, etc. Furthermore, a toner or ink cartridge of the printing device may include an electronic label ("e-label") as disclosed in the U.S. Pat. No. 6,233,409, currently assigned to HEWLETT-PACKARD COMPANY, the disclosure of which is hereby incorporated by reference in its entirety. The e-label may include a memory and the e-label may be configured to store a variety of data. For example, the e-label may store the color of toner within the toner cartridge. The e-label may further be configured to store toner used and/or remaining data.

FIG. 1 is a block diagram of a system 100, according to an embodiment of the invention. The system 100 generally illustrates components of a printing device. As shown in FIG. 1, the system 100 may include an input/output ("I/O") interface 120, a controller 130, a memory 140, an e-label 150, interface electronics 160 and a laser 170. Typically, a print job may be sent by a host device 110 and received by the I/O interface 120, however, as is known to those skilled in the art, the functionality of the host device 110 may be subsumed within the system 100 e.g., an electronic typewriter, a copier, etc.

Additionally, the system 100 may include a sensor 180. The sensor 180 may be operable to measure and/or infer environmental conditions (e.g., temperature, RH, barometric pressure, etc.). In one form, the sensor 180 may be integrated within an ICC such as the controller 130 and/or the e-label 150. In another form, the system 100 may utilize an existing ICC as the sensor 180. In any event, the sensor 180 may be configured to communicate data associated with the measured environmental condition(s) to the controller 130 and/or the e-label 150. Due to heat produced by various components the printing device (e.g., motors, fuser, laser, etc.) the environmental conditions may be relatively different within the printing device as compared to outside the printing device. More specifically, the environmental conditions within the area where toner is transferred to the print medium (i.e., the EP area), may be relatively different as compared to other areas outside or within the printing device. In various forms, the sensor 180 may be located within the EP area, downstream of airflow through the EP area and/or thermally connected to the EP area. In other words, the sensor 180 is preferably located such that it is operable to sense essentially the same environment as within the EP area.

In a preferred form, the sensor 180 may measure temperature and RH. Examples of electronic components that may be integrated within the controller 130 and/or the e-label 150 to be utilized as the sensor 180 may include: thermocouples, temperature sensitive transistors, rheostats, thin-rim capacitance meters, Dunmore cells and Pope cells. Furthermore, environmental conditions may be inferred based on performance characteristics of an electronic device not specifically designed to measure environmental conditions. For example, the frequency of an electromagnetic signal emitted by the controller 130 and/or the e-label 150 may be modified as a function of temperature. The frequency may be monitored and compared to a known response curve to determine the temperature of the controller 130 and/or the e-label 150. In a second example, power consumed by, electrical resistance of and/or varying amounts of capacitance of the controller 130 and/or the e-label 150 may be monitored and compared to one or more experimentally derived response cures to determine various environmental factors.

Furthermore, while integrating the sensor 180 within or to the controller 130 and the e-label 150 are mentioned, it is within the scope of the invention that the sensor 180 may connected to or integrated within any electronic component of the system 100. In this regard, placement of and connection to the sensor 180 within the system 100 may be based on the following factors: proximity to the EP area, direction of airflow, thermal conductivity of adjacent materials, etc.

To accurately estimate toner usage, a pulse width count ("PWC") may be accumulated. The PWC is a measure of the accumulated width of pulses. It is a phenomenon of the electrophotographic process that, for a given PWC, varying the environment in which a printer is located results in a non-linear amount of toner transfer. A detailed explanation of this phenomenon is given in U.S. patent application Ser. No. 09/928,502, currently assigned to HEWLETT-PACKARD COMPANY, and is hereby incorporated in its entirety.

Figure 2:
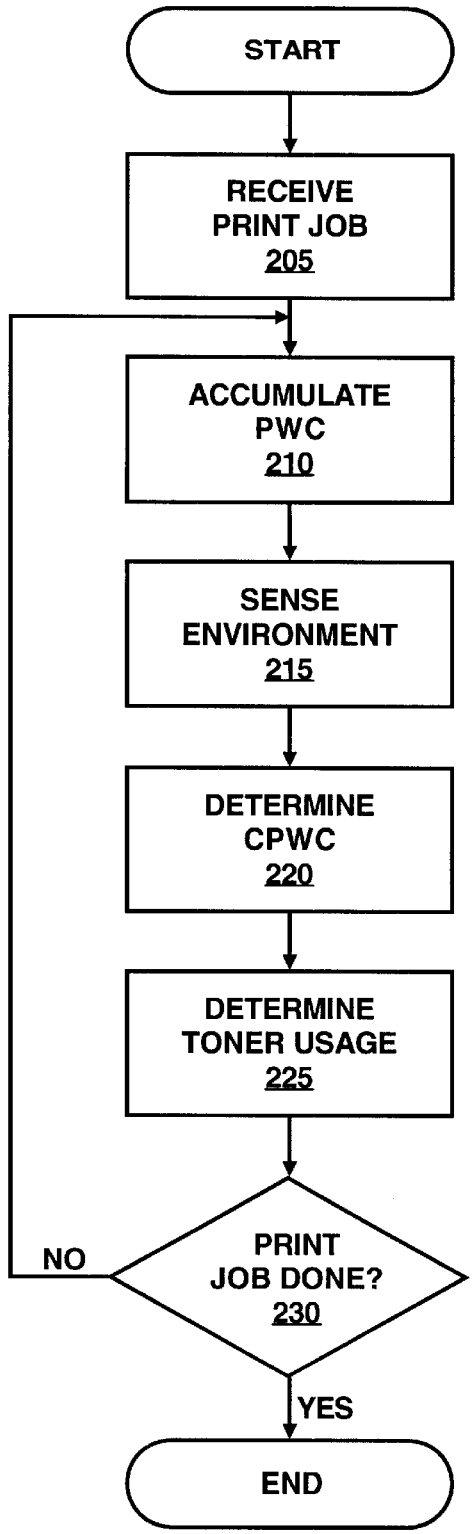
FIG. 2 is a flow chart of a method, according to an embodiment of the invention.

FIG. 2 is a flow chart of a method 200, in accordance with a manner in which an embodiment of the invention may be practiced. As depicted in FIG. 2, the method 200 is initiated in response to receiving a print job in step 205.

In step 210, the PWC may be accumulated based on the print job or corresponding printer specific commands generated in response to the print job. The PWC may be determined at the time the print job is generated, after the print job has finished printing, and/or any time in between. In a preferred form, a PWC may be accumulated for each page of the print job. The PWC for each pixel may be determined as the pixel is being produced. The PWC for each pixel may be added to previously determined PWCs to accumulate a PWC value for each scanned line. An accumulated PWC value for each page may be determined in a variety of ways, such as by adding the values of all of the pixels or scan lines within the page. Similarly, an accumulated print job and usable lifespan of the toner cartridge PWC may be determined.

In step 215, the environmental conditions may be measured by the sensor 180 as described in FIG. 1. In various forms, the environmental conditions may be measured before the print job is generated, after the print job has finished printing, and/or any time in between. Accordingly, the steps 210 and 215 need not be performed in the order as shown in FIG. 2, but rather, the steps 210 and 215 may be performed in the opposite order or simultaneously. In a preferred form, the temperature and/or RH may be measured while printing the print job. For example, the temperature and/or RH may be measured by the sensor 180 as each page of the print job is being produced. Although measuring the temperature and/or RH is described in this invention, it is to be understood that the invention is not limited to measuring the temperature and/or RH, but rather, the invention may be configured to sense any number of environmental factors (e.g., barometric pressure, dew point, etc.) and modify PWC based on one or more environmental factor.

In step 220, the method 200 may determine a corrected PWC ("CPWC"). In this regard, the PWC may be adjusted based on the environmental factor to obtain the CPWC. Estimation of toner usage utilizing CPWC correlates to actual toner usage more accurately than pixel counting alone. The temperature and/or RH may be utilized to determine the CPWC for each pixel, scan line, page, print job and or the usable lifespan of the toner cartridge. In a preferred form, the CPWC value for each page may be determined by referencing the PWC, temperature and/or RH for the page and applying these values to a look up table ("LUT"), such as, the LUT disclosed in U.S. Pat. No. 5,793,406, currently assigned to HEWLETT-PACKARD COMPANY, and is herein incorporated by reference in its entirety. Additionally or instead of the LUT, a statistical regression equation ("SRE") substantially the same as the SRE used to generate the LUT may be used to determine the CPWC without departing from the scope of the invention. In general, the LUT may be thought of as a predetermined or static SRE that is less resource intensive than the SRE but less capable of adjustability. A combination of LUT and SRE may be incorporated in such a way as to utilize the LUT for common PWCs, thus saving system resources and increasing print speed. The SRE may be utilized for uncommon PWCs to increase accuracy of toner estimation. Moreover, the SRE and/or the LUT may take into account the following factors: system design, toner chemistry, OPR sensitivity, PWC, pulse edge count, associated half tone level, pixel count, temperature, relative humidity, empirical data, etc.

Additionally or instead of step 220, in step 225 the method 200 may determine toner usage. For example, the method 200 may reference the CPWC to determine the toner usage or the method 200 may reference the PWC, temperature and/or RH values within an SRE or LUT that corrects the PWC based on the temperature and/or RH and determines toner usage in a single process. After determining the toner usage, the value may be stored within memory. A toner remaining value may be determined as well. For example, based on a predetermined starting amount of toner and the toner usage, the toner remaining may be calculated. Furthermore, PWC, temperature, RH, CPWC, toner remaining, and pixel count values may be stored within memory.

In step 230, it may be determined if the method 200 has reached the end of the print job or the corresponding printer specific commands generated in response to the print job. For example, if an end of file marker is encountered, the method 200 may terminate. If it is determined that the end of the print job or the corresponding printer specific commands generated in response to the print job has not been reached, the method 200 may return to step 210.

Figure 3:
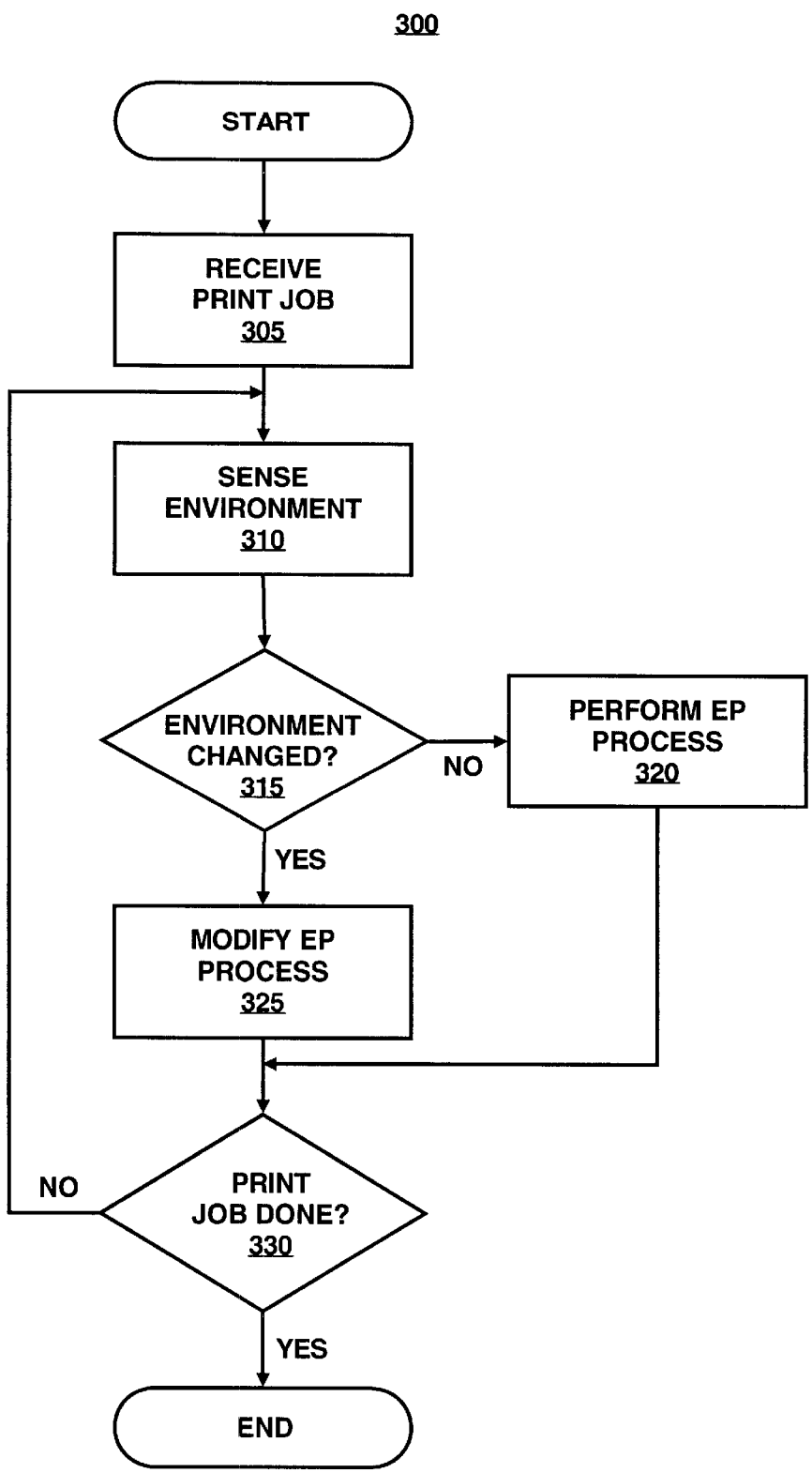
FIG. 3 is a flow chart of a method, according to another embodiment of the invention.

FIG. 3 is a flow chart of a method 300, according to an embodiment of the invention. As depicted in FIG. 3, the method 300 is initiated in response to receiving a print job in step 305.

In step 310, the environmental conditions may be measured by the sensor 180 as described in FIG. 1. In various forms, the environmental conditions may be measured before the print job is generated, after the print job has finished printing, and/or any time in between. Accordingly, the steps 305 and 310 need not be performed in the order as shown in FIG. 3, but rather, the steps 305 and 310 may be performed in the opposite order or simultaneously. In a preferred form, the temperature and/or RH may be measured while printing the print job. For example, the temperature and/or RH may be measured by the sensor 180 as each page of the print job is being produced. Although measuring the temperature and/or RH is described in this invention, it is to be understood that the invention is not limited to measuring the temperature and/or RH, but rather, the invention may be configured to sense any number of environmental factors and modify the EP process based on one or more environmental factor.

In step 315, it may be determined if the environmental conditions have changed. For example, the environmental conditions may be compared to previously measured environmental conditions. If it is determined that the environmental conditions have not changed, the method 300 may proceed to step 320. If it is determined that the environmental conditions have c.hanged, the method 300 may proceed to step 325.

In step 320, the EP process may be performed. As is known to those skilled in the art, the EP process may be modified based on the print job. Additionally, the EP process may be performed utilizing previously measured environmental conditions. Following the step 320, the method 300 may proceed to step 330.

In step 325, the EP process may be modified based on the measured environmental conditions. Generally, the modifications pertain to controlling the amount of toner transferred to the print medium. In this regard, a variety of methods may be utilized to control toner transfer. In a preferred form, a laser within a printing device may be modulated to control the width of pulses (i.e., the pulse width) of light utilized to illuminate an optical photoreceptor drum and thus, as known to those skilled in the art, control the amount of toner transferred to the print medium. In another form, a bias voltage within a developer of the printing device may be modified to control toner transfer. Modulating the bias voltage of the developer produces a corresponding change in the charge of the toner within the toner cartridge and thus, controls the amount of toner transfer to the print medium. In yet another form, a charge on a print roller within the printing device may be modified to control toner transfer. Modulating the charge on the print roller, as is known to those skilled in the art, produces a corresponding change in the amount of toner transfer to the print medium. Additionally, in a printing device having an intermediate transfer belt ("ITB") designed to transfer toner to the print medium such as is present in some conventional color laser printers, the speed of the ITB may be modulated to control the amount of toner transferred to the print medium. Furthermore, it is to be understood that the invention is not limited to the EP process modifications mentioned above, but rather, the invention may include any known or future means of controlling toner transfer. Accordingly, the EP process modifications mentioned above are for illustrative purposes only and thus are not meant to limit the invention in any respect.

In step 330, it may be determined if the method 300 has reached the end of the print job or the corresponding printer specific commands generated in response to the print job. For example, if an end of file marker is encountered, the method 300 may terminate. If it is determined that the end of the print job or the corresponding printer specific commands generated in response to the print job has not been reached, the method 300 may return to step 310.

The methods 200 and 300 may exist in a variety of forms both active and inactive. For example, they may exist as software program(s) comprised of program instructions in source code object code, executable code or other formats. Any of the above may be embodied on a computer readable medium, which include storage devices and signals, in compressed or uncompressed form. Exemplary computer readable storage devices include conventional computer system RAM (random access memory), ROM (read only memory), EPROM (erasable, programmable ROM), EEPROM (electrically erasable, programmable ROM), flash memory, and magnetic or optical disks or tapes. Exemplary computer readable signals, whether modulated using a carrier or not, are signals that a computer system hosting or running the computer program may be configured to access, including signals downloaded through the Internet or other networks. Concrete examples of the foregoing include distribution of the program(s) on a CD ROM or via Internet download. In a sense, the Internet itself, as an abstract entity, is a computer readable medium. The same is true of computer networks in general.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims—and their equivalents—in which all terms are meant in their broadest reasonable sense unless otherwise indicated.

What is claimed is:

1. A method for modifying an electrophotographic process in response to an environmental factor within an electrophotographic area of a printing device, the method comprising:
   sensing the environmental factor within the electrophotographic area of the printing device;
   determining a pulse width count; and
   modifying the electrophotographic process in response to the sensed environmental factor, the electrophotographic process comprising calculating a toner usage, wherein calculating the toner usage comprises:
      calculating a corrected pulse width count based on the pulse width count and the sensed environmental factor, wherein the corrected pulse width count is utilized to calculate the toner usage.

2. The method according to claim 1, wherein the environmental factor comprises one or both of the temperature and the relative humidity.

3. The method according to claim 1, wherein the electrophotographic process comprises controlling a pulse width to regulate the amount of toner transferred to a print medium, the method further comprising:
   modulating a laser to control the pulse width based on the environmental factor, wherein the pulse width corresponds to the amount of toner transferred to the print medium.

4. The method according to claim 1, wherein the electrophotographic process comprises controlling a bias voltage within a developer of the printing device to regulate the amount of toner transferred to a print medium, the method further comprising:
   modulating the bias voltage within the developer of the printing device based on the environmental factor, wherein the bias voltage corresponds to the amount of toner transferred to,the print medium.

5. The method according to claim 1, wherein the electrophotographic process comprises controlling a charge on a print roller within the printing device to regulate the amount of toner transferred to a print medium, the method further comprising:
   modulating the charge on the print roller based on the environmental factor, wherein the charge on the print roller corresponds to the amount of toner transferred to the print medium.

6. The method according to claim 3, wherein the electrophotographic process comprises controlling a speed of an intermediate transfer belt within the printing device to regulate the amount of toner transferred to a print medium, the method further comprising:
   modulating the speed of the intermediate transfer belt based on the environmental factor, wherein the speed of the intermediate transfer belt corresponds to the amount of toner transferred to the print medium.

7. A computer readable medium on which is embedded computer software, the software being executable to perform a method of modifying an electrophotographic process in response to an environmental factor within an electrophotographic area of a printing device, the method comprising:
   sensing the environmental factor within the electrophotographic area of the printing device;
   determining a pulse width count; and
   modifying the electrophotographic process in response to the sensed environmental factor, the electrophotographic process comprising calculating a toner usage, wherein calculating the toner usage comprises:
      calculating a corrected pulse width count based on the pulse width count and the sensed environmental factor, wherein the corrected pulse width count is utilized to calculate the toner usage.

8. The computer readable medium according to claim 7, wherein the environmental factor comprises one or both of the temperature and the relative humidity.

9. The computer readable medium according to claim 7, wherein the electrophotographic process comprises controlling a pulse width to regulate the amount of toner transferred to a print medium, the method further comprising:
   modulating a laser to control the pulse width based on the environmental factor, wherein the pulse width corresponds to the amount of toner transferred to the print medium.

10. The computer readable medium according to claim 7, wherein the electrophotographic process comprises controlling a bias voltage within a developer of the printing device to regulate the amount of toner transferred to a print medium, the method further comprising:
    modulating the bias voltage within the developer of the printing device based on the environmental factor, wherein the bias voltage corresponds to the amount of toner transferred to the print medium.

11. The computer readable medium according to claim 7, wherein the electrophotographic process comprises controlling a charge on a print roller within the printing device to regulate the amount of toner transferred to a print medium, the method further comprising:
    modulating the charge on the print roller based on the environmental factor, wherein the charge on the print roller corresponds to the amount of toner transferred to the print medium.

12. The computer readable medium according to claim 7, wherein the electrophotographic process comprises controlling a speed of an intermediate transfer belt within the printing device to regulate an amount of toner transferred to a print medium, the method further comprising:

modulating the speed of the intermediate transfer belt based on the environmental factor, wherein the speed of the intermediate transfer belt corresponds to the amount of toner transferred to the print medium.

13. A system for determining an environmental factor within a printing area of a printer, the system comprising:

a sensor being operable to sense the environmental factor within the printing area of the printer, the sensor being integrated within an electronic component of the printer, wherein the electronic component is one or both of an electronic label and a controller; and a processor system including the electronic component and being configured to communicate with the sensor to determine the environmental factor for calculating toner usage based on the data associated with the environmental factor.

14. The system according to claim 13, wherein the sensor is further operable to forward the data associated with the environmental factor to the processor system.

15. The system according to claim 13, wherein the processor system is configured to modulate a laser to control a pulse width based on the environmental factor, wherein the pulse width corresponds to the amount of toner transferred to a print medium.

16. The system according to claim 13, wherein the processor system is configured to modulate the speed of an intermediate transfer belt based on the environmental factor, wherein the speed of the intermediate transfer belt corresponds to the amount of toner transferred to a print medium.

17. An apparatus for modifying an electrophotographic process in response to an environmental factor within an electrophotographic area of a printing device, the apparatus comprising:

means for sensing the environmental factor within the electrophotographic area of the printing device;

means for determining a pulse width count;

means for modifying the electrophotographic process in response to the sensed environmental factor, the electrophotographic process comprising calculating a toner usage, wherein calculating the toner usage comprises:
means for calculating a corrected pulse width count based on the pulse width count and the sensed environmental factor, wherein the corrected pulse width count is utilized to calculate the toner usage.

18. The apparatus according to claim 17, wherein the sensing means includes a means for sensing one or both of the temperature and the relative humidity.

19. The apparatus according to claim 17, wherein the modifying means includes means for controlling a pulse width to regulate the amount of toner transferred to a print medium, the apparatus further comprising:

means for modulating a laser to control the pulse width based on the environmental factor, wherein the pulse width corresponds to the amount of toner transferred to the print medium.

20. The apparatus according to claim 17, wherein the modifying means includes means for controlling a bias voltage within a developer of the printing device to regulate the amount of toner transferred to a print medium, the apparatus further comprising:

means for modulating the bias voltage within the developer of the printing device based on the environmental factor, wherein the bias voltage corresponds to the amount of toner transferred to the print medium.

21. The apparatus according to claim 17, wherein the modifying means includes means for controlling a charge on a print roller within the printing device to regulate the amount of toner transferred to a print medium, the apparatus further comprising:

means for modulating the charge on the print roller based on the environmental factor, wherein the charge on the print roller corresponds to the amount of toner transferred to the print medium.

22. The apparatus according to claim 17, wherein the modifying means includes means for controlling a speed of an intermediate transfer belt within the printing device to regulate the amount of toner transferred to a print medium, the apparatus further comprising:

means for modulating the speed of the intermediate transfer belt based on the environmental factor, wherein the speed of the intermediate transfer belt corresponds to the amount of toner transferred to the print medium.

* * * * *

UNITED STATES PATENT AND TRADEMARK OFFICE
CERTIFICATE OF CORRECTION

PATENT NO. : 6,560,417 B1
DATED : May 6, 2003
INVENTOR(S) : Santiago Rodriguez

It is certified that error appears in the above-identified patent and that said Letters Patent is hereby corrected as shown below:

Column 6,
Line 18, delete "c.hanged," and insert therefor -- changed, --

Column 7,
Line 65, delete "to.the" and insert therefor -- to the --

Signed and Sealed this

Twenty-fifth Day of January, 2005

JON W. DUDAS
*Director of the United States Patent and Trademark Office*